United States Patent
Laurent-Michel et al.

(10) Patent No.: US 10,305,525 B2
(45) Date of Patent: *May 28, 2019

(54) INTERFERENCE CANCELLATION IN MICROWAVE BACKHAUL SYSTEMS

(71) Applicant: Maxlinear, Inc., Carlsbad, CA (US)

(72) Inventors: Stephane Laurent-Michel, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,176

(22) Filed: Feb. 23, 2018

(65) Prior Publication Data

US 2018/0183473 A1 Jun. 28, 2018

Related U.S. Application Data

(63) Continuation of application No. 15/297,963, filed on Oct. 19, 2016, now Pat. No. 9,923,585, which is a
(Continued)

(51) Int. Cl.
*H04B 1/10* (2006.01)
*H01Q 25/00* (2006.01)
(Continued)

(52) U.S. Cl.
CPC ........... *H04B 1/1027* (2013.01); *H01Q 19/13* (2013.01); *H01Q 19/18* (2013.01); *H01Q 25/005* (2013.01);
(Continued)

(58) Field of Classification Search
CPC .... H04B 1/1081; H04B 1/1027; H04B 1/123; H04L 25/03057; H01Q 19/13; H01Q 19/18; H01Q 25/005
See application file for complete search history.

(56) References Cited

U.S. PATENT DOCUMENTS 2,876,448 A * 3/1959 Guanella ............... H03H 7/487
  333/125
4,933,682 A * 6/1990 Vaughan ................ H01Q 3/12
  342/424

(Continued)

OTHER PUBLICATIONS

Manning, T., Microwave Radio Transmission Design Guide, 2nd Edition.

*Primary Examiner* — Vineeta S Panwalkar (74) *Attorney, Agent, or Firm* — McAndrews, Held & Malloy, Ltd.

(57) ABSTRACT

A first microwave backhaul assembly comprises a first antenna, a front-end circuit, an inter-backhaul-assembly interface circuit, and an interference cancellation circuit. The first antenna is operable to receive a first microwave signal. The front-end circuit is operable to convert the first microwave signal to a lower-frequency digital signal, wherein the lower-frequency digital signal has energy of a second microwave signal and energy of a third microwave signal. The inter-backhaul-assembly interface circuit is operable to receive information from a second microwave backhaul assembly. The interference cancellation circuit is operable to use the information received via the inter-backhaul-assembly interface circuit during processing of the lower-frequency digital signal to remove, from the first microwave signal, the energy of the third microwave signal. The information received via the inter-backhaul-assembly interface may comprise a signal having energy of the second microwave signal.

38 Claims, 7 Drawing Sheets

Related U.S. Application Data continuation of application No. 15/050,537, filed on Feb. 23, 2016, now Pat. No. 9,503,137, which is a continuation of application No. 14/586,330, filed on Dec. 30, 2014, now Pat. No. 9,270,310.

(60) Provisional application No. 61/921,660, filed on Dec. 30, 2013.

(51) Int. Cl.
*H01Q 19/18* (2006.01)
*H01Q 19/13* (2006.01)
*H04L 25/03* (2006.01)
*H04B 1/12* (2006.01)

(52) U.S. Cl.
CPC ............ *H04B 1/1081* (2013.01); *H04B 1/123* (2013.01); *H04L 25/03057* (2013.01)

(56) References Cited

U.S. PATENT DOCUMENTS

| | | |
|---|---|---|
| 8,467,363 B2 | 6/2013 | Lea et al. |
| 9,270,310 B2 | 2/2016 | Laurent-Michel et al. |
| 9,503,137 B2 | 11/2016 | Laurent-Michel et al. |
| 2007/0217373 A1 | 9/2007 | Kotzin et al. |
| 2013/0102254 A1 | 4/2013 | Cyzs et al. |
| 2013/0188760 A1* | 7/2013 | Subramanian ....... H04J 11/0023 375/346 |

* cited by examiner

INTERFERENCE CANCELLATION IN MICROWAVE BACKHAUL SYSTEMS

CROSS-REFERENCE TO RELATED APPLICATIONS (PRIORITY CLAIM)

This application is a continuation of U.S. patent application Ser. No. 15/297,963, filed Oct. 19, 2016, which is a continuation of U.S. patent application Ser. No. 15/050,537, filed Feb. 23, 2016, now U.S. Pat. No. 9,503,137, which is a continuation of U.S. patent application Ser. No. 14/586,330, filed Dec. 30, 2014, now U.S. Pat. No. 9,270,310, which claims priority to U.S. Provisional Patent Application No. 61/921,660, filed on Dec. 30, 2013. Each of the aforementioned documents is hereby incorporated herein by reference in its entirety.

BACKGROUND

Limitations and disadvantages of conventional approaches to microwave backhaul systems will become apparent to one of skill in the art, through comparison of such approaches with some aspects of the present method and system set forth in the remainder of this disclosure with reference to the drawings.

BRIEF SUMMARY

Methods and systems are provided for interference cancellation in microwave backhaul systems, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set { (x), (y), (z), (x, y), (x, z), (y, z), (x, y, z)}. In other words, "x, y, and/or z" means "one or more of x, y, and z." As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
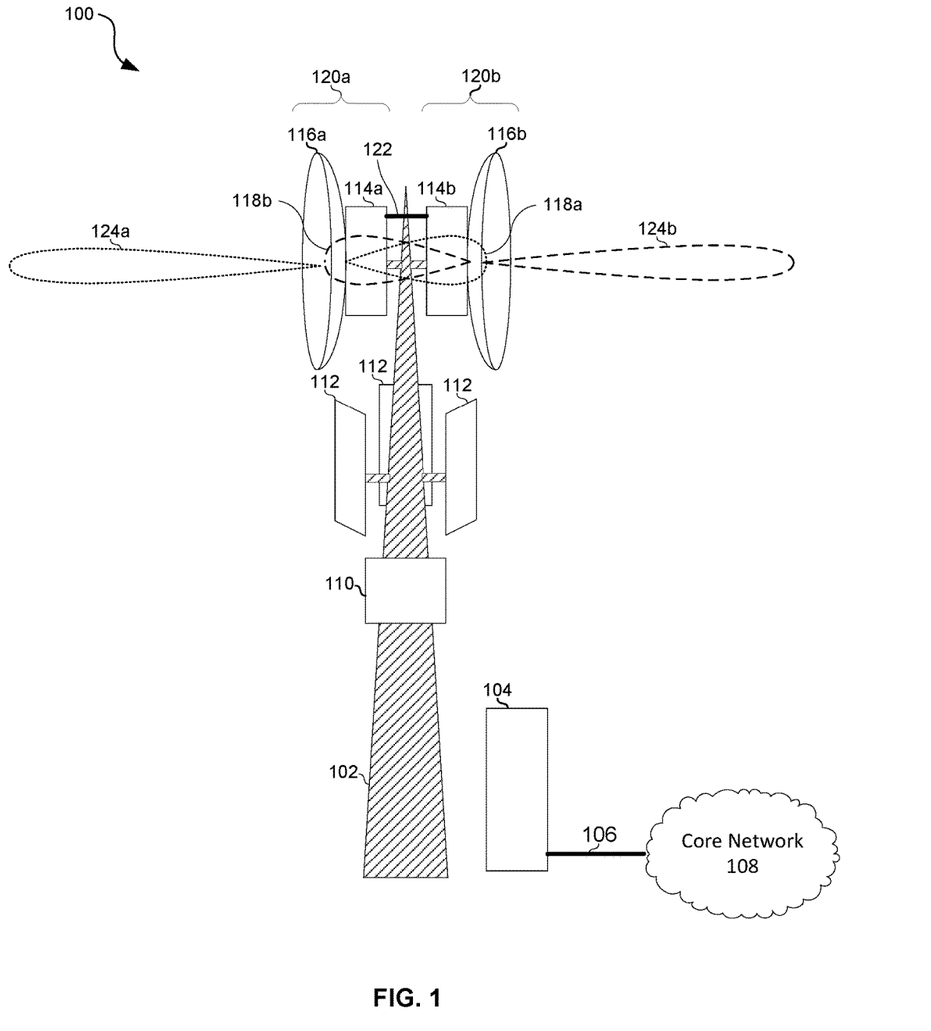
FIG. 1 depicts a system comprising two microwave backhaul assemblies for supporting at least two microwave backhaul links.

FIG. 1 depicts a system comprising two microwave backhaul assemblies for supporting at least two microwave backhaul links. Shown is a tower 102 to which is mounted microwave backhaul assembly 120a comprising antenna 116a and subassembly 114a, and a microwave backhaul assembly 120b comprising antenna 116b and subassembly 114b. In the example implementation shown, the microwave assemblies are used for backhauling a mobile network (e.g., 3G, 4G LTE, 5G, etc.). Accordingly, also shown are mobile access network antennas 112, remote radio head (RRH) 110, and basestation 104. The RRH may be connected to the mobile access network antennas 112 wirelessly or via cables (not shown for clarity of illustration). One or both of the assemblies 120a and 120b may connect to the RRH 110 and/or to the basestation 104 via wires, optical cables, and/or wirelessly (not shown for clarity of illustration). The basestation 104 connects to a core network 108 via a backhaul link 106 which may be, for example, optical fiber. In other implementations, the microwave backhaul assemblies 120a and 120b may backhaul traffic of other networks (e.g., television and/or radio distribution networks) instead of, or in addition to, traffic of the mobile network.

An example implementation of the microwave backhaul assemblies 120a and 120b is described below with reference to FIG. 2.

In operation, each of the microwave backhaul assemblies 120a and 120b generates one or more desired lobes 124 via which they communicate with respective link partners (not shown) and one or more undesired lobes 118. The microwave backhaul assemblies 120a communicate with each other via a link 122 which may be wired, optical, or wireless.

Figure 2:
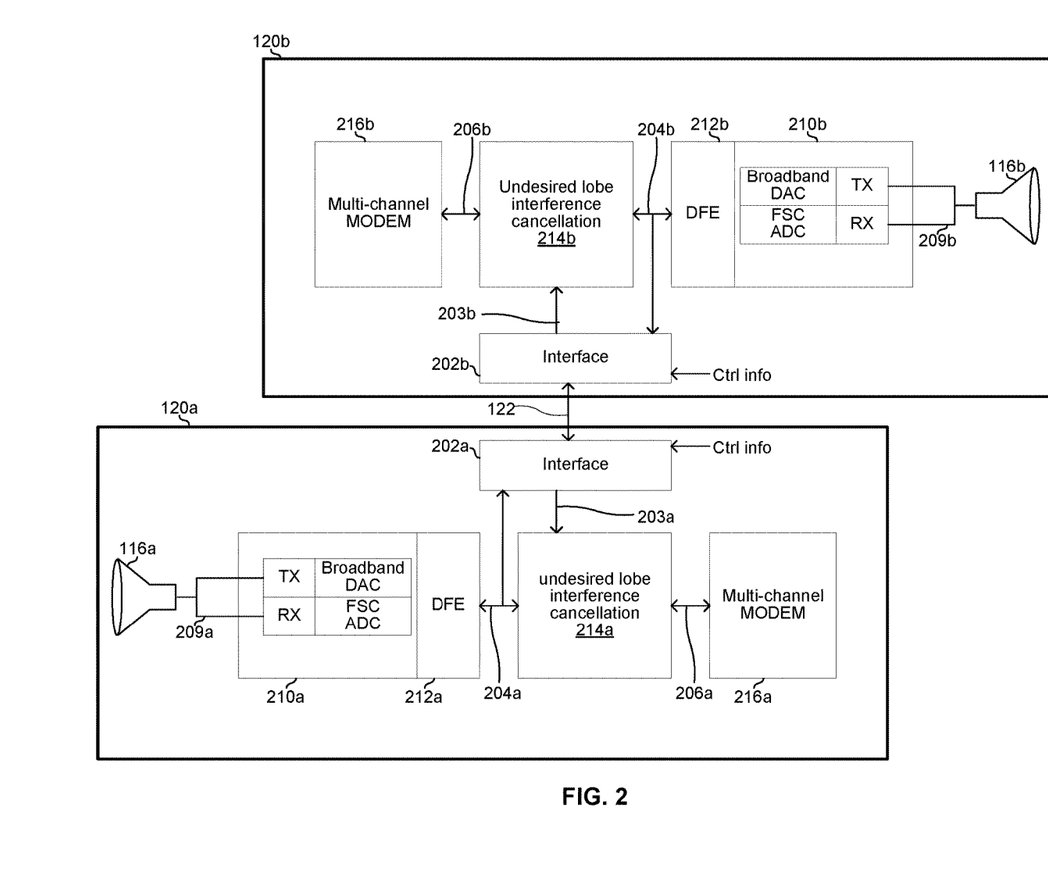
FIG. 2 depicts a first example implementation of the microwave backhaul assemblies of FIG. 1.

FIG. 2 depicts a first example implementation of the microwave backhaul assemblies of FIG. 1. In FIG. 2, each of the assemblies 120a and 120b comprises its respective antenna 116, an analog/RF front-end circuit 210, digital front-end (DFE) circuit 212, interference cancellation circuit 214, modem circuit 216, and interface 202.

Each of the analog/RF front-end circuits 210 comprises a transmit analog/RF front-end (AFE), a receive analog/RF front-end (AFE), a digital-to-analog converter (DAC), and an analog-to-digital converter (ADC). The transmit AFE may comprise, for example, one or more filters, an upconverter, and a power amplifier. The receive AFE may comprise, for example, a low nose amplifier, a downconverter, and one or more filters. The DAC is operable to convert a digital broadband signal (e.g., having a bandwidth of multiple gigahertz) from the DFE 212 to an analog representation for conveyance to the transmit AFE. The ADC is operable to convert a broadband analog signal (e.g., spanning multiple gigahertz) from the receiver AFE to a digital representation for conveyance to the DFE 212.

For transmit, each of the MODEM circuits 216 is operable to perform functions such as encoding, interleaving, and bit-to-symbol mapping. For receive, each of the MODEM circuits 216 is operable to perform functions such as decoding, deinterleaving, and symbol-to-bit demapping for receive.

Each of the DFE circuits 212 is operable to perform digital processing functions such as, for example, amplifier linearization, cross-polarization cancellation, and I/Q offset calibration. For receive, the DFE 212 outputs a respective signal 204, which is conveyed to both a respective interference cancellation circuit 214 and a respective interface 202. For transmit, the DFE 212 receives signal 204 from a respective interference cancellation circuit 214.

The interface circuit 202a is operable to output data onto link 122 and the interface circuit 202b is operable to receive the data from interface circuit 202a and output the data as signal 203b. Similarly, the interface circuit 202b is operable to output data onto link 122 and the interface circuit 202a is operable to receive the data from interface circuit 202b and output the data as signal 203a. The data communicated over the link 122 may comprise, for example: the signal 204a and 204b, information extracted from the signals 204a and 204b, information about the signals 204a and 204b (e.g., one or more performance metrics such as received signal strength), information about a configuration of the various circuits of the assemblies 120a and 120b, data generated by MODEMs 216a and 216b, data recovered from received signals by the MODEMS 216a and 216b, and/or the like.

The interference cancellation circuit 214a is operable to process signals 203a and 204a to remove undesired signal components from the signal 204a and output the desired signal components of signal 204a as signal 206a. Similarly, the interference cancellation circuit 214b is operable to process signals 203b and 204b to remove undesired signal components from the signal 204b and output the desired signal components of signal 204b as signal 206b. An example is described below with reference to FIGS. 3A and 3B.

Figure 3A:
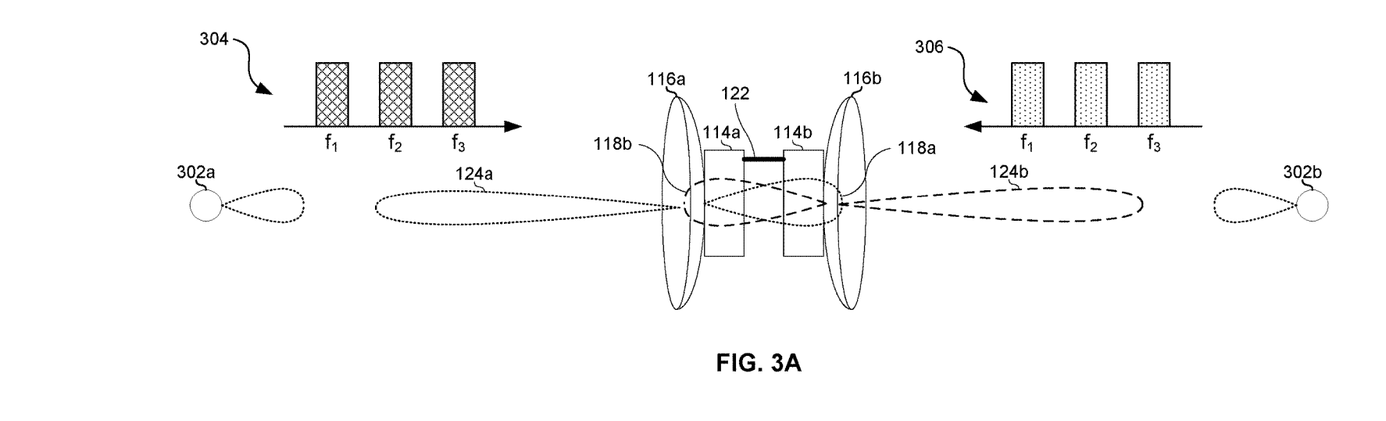
FIGS. 3A and 3B depict a scenario in which aspects of this disclosure are used for reducing the impact of interference resulting from back lobes of the two microwave backhaul assemblies.
Figure 3B:
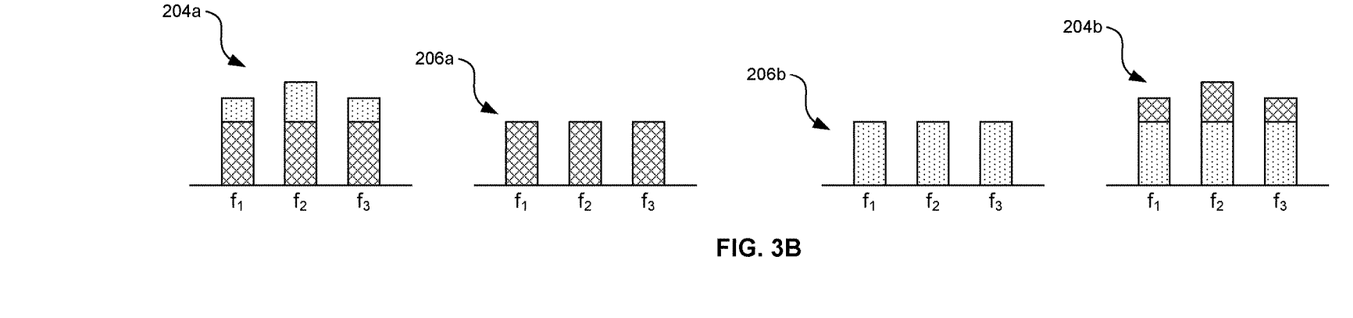

FIGS. 3A and 3B depict a scenario in which aspects of this disclosure are used for reducing the impact of interference resulting from back lobes of the two microwave backhaul assemblies. In FIGS. 3A and 3B, assembly 120a is attempting to receive signal 304 from node 302a and assembly 120b is attempting to receive signal 306 from node 302b. In generating desired radiation lobe 124a, however, assembly 120a also generates an undesired back lobe 114a. Similarly, in generating desired radiation lobe 124b, assembly 120b also generates an undesired back lobe 114b. Due to the back lobes 118a and 118b, energy of signal 306 is received by assembly 120a and energy of signal 304 is received by assembly 120b. Thus, the two signals interfere with each other. This is shown in FIG. 3B where signals 204a and 204b each include components of both signals 304 (cross hatched) and 306 (dotted). The amount of interference depends on the front-to-back ratios of the antennas 116a and 116b. In practice, the amount of interference can be substantial because improving the front-to-back ratios beyond a certain point can be cost prohibitive. One way to mitigate the effect of this interference is for signals 304 and 306 to use different frequencies, but such a solution complicates frequency planning and results in inefficient use of spectrum.

In an example implementation, the interface circuits 202a and 202b exchange the signals 204a and 204b over the link 122. That is, assembly 120a sends 204a over the link 122 and assembly 120b sends 204b over the link 122. In this manner, each of the interference cancellation circuits 214a and 214b is in possession of sufficient information for cancelling much of the interference and significantly improving the performance of the backhaul system. In the ideal case shown in FIG. 3B, the interference is perfectly cancelled/removed such that signal 206a contains only a signal 304 component and signal 206b contains only a signal 306 component. In a variation of this implementation, the interface circuits 202a and 202b may exchange information instead of, or in addition to, the signals 204a and 204b. For example, the AFEs 210a and 210b may measure received signal strength (RSS) for their respective signals, and the RSS measurements may be exchanged between interface circuits 202a and 202b over the link 122. The interference cancellation circuits 214a and 214b may then be configured based on the RSS received from AFEs 210a and 210b, respectively. For example, if AFE 210a measures little or no signal, the system may decide that interference cancellation is unnecessary and therefore disable interference cancellation circuits 214a and 214b to reduce energy consumption.

Figure 4:
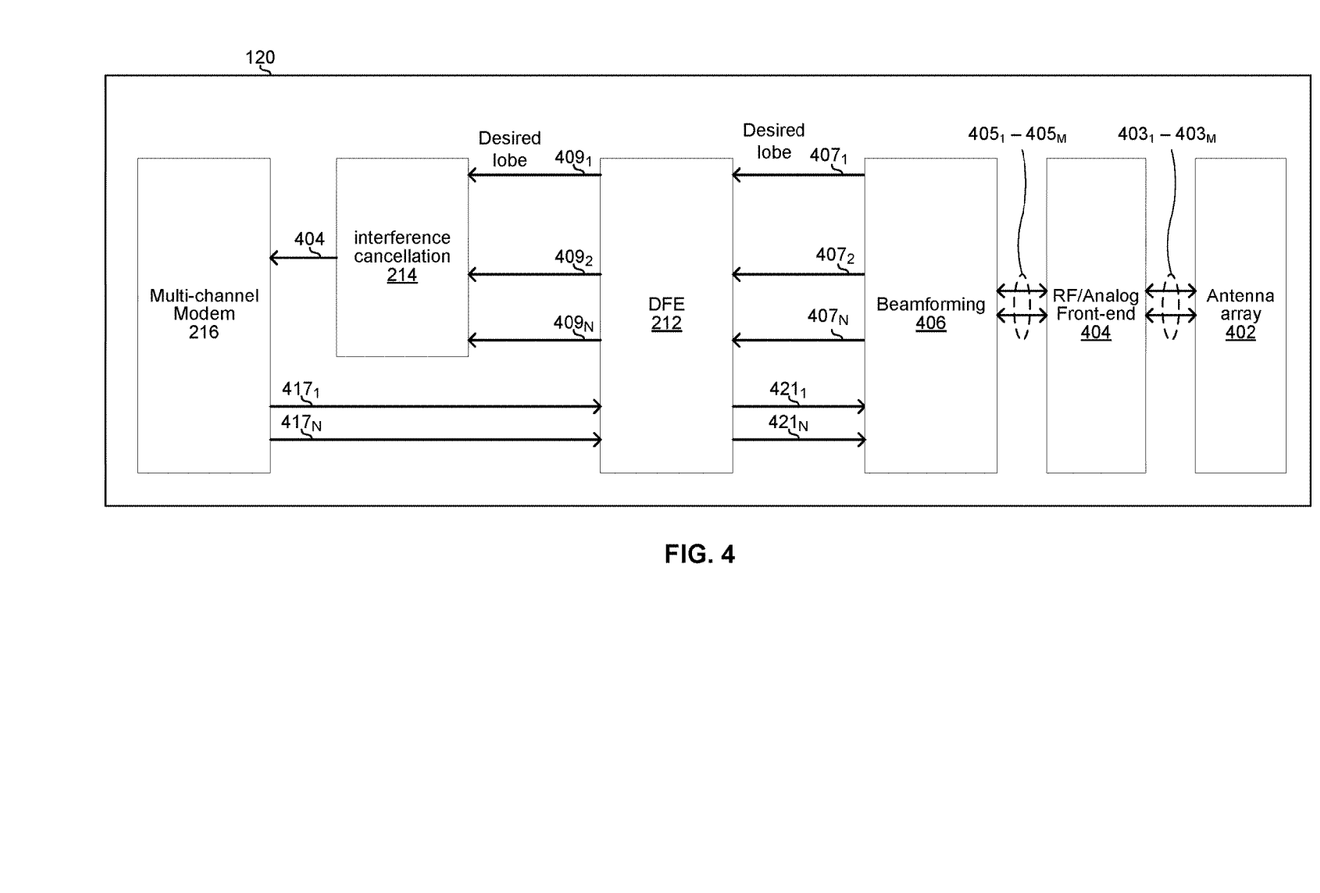
FIG. 4 depicts a second example implementation of a microwave backhaul assembly such as the microwave backhaul assemblies shown in FIG. 1.

FIG. 4 depicts a second example implementation of a microwave backhaul assembly such as the microwave backhaul assemblies shown in FIG. 1. In the implementation of FIG. 4, the assembly 120 (which may represent either of 120a and 120b of FIG. 1) comprises antenna array 402, RF/analog front-end circuit 404, beamforming circuit 406, digital processing circuit 408, interference cancellation circuit 214, and modem 216.

The antenna array 402 may comprise, for example, an array of M (an integer>1) microstrip patches or horns. In an example implementation, the array 402 may be positioned at or near the focal point of a dish such as 116a. For receive, each of the N elements of the array 402 may output a respective one of signals $403_1$-$403_M$ to AFE 404. For transmit, each of the elements of the array 402 may receive a respective one of signals $403_1$-$403_M$ from AFE 404.

The RF/analog front-end circuit 404 comprises, for example, M transmit RF/analog front-ends and M receive RF/analog front-ends, where each front end is coupled to a respective one of a plurality of antenna elements of the array 402. Each receive front-end may comprise, for example, a low-noise amplifier, downconverter, and analog-to-digital converter. Each transmit front-end may comprise, for example, a digital-to-analog converter, upconverter, and power amplifier. For receive, the AFE 404 may convert N microwave signals 403 to M digital baseband signals $405_1$-$405_M$. For transmit, the AFE 404 may convert M digital baseband signals $405_1$-$405_M$ to M microwave signals 403.

The beamforming circuit 406 is operable to perform digital signal processing to implement a beamforming algorithm. For receive, the beamforming circuit 406 is operable to process M signals $405_1$-$405_M$ to recover N signals $407_1$-$407_N$ (each corresponding to a respective lobe or "beam"), where N is an integer. Such processing may comprise combining gain and/or phase weighted combining of selected ones of the signals $405_1$-$405_M$. For transmit, the beamforming circuit 406 is operable to process the N signals $421_1$-$421_N$ to generate signals $405_1$-$405_M$ that, when transmitted via the array 402, result in the desired lobes. Such processing may comprise gain and/or phase weighted combining of selected ones of the signals $421_1$-$421_M$.

The DFE 212 is as described above. For receive, the DFE 212 is operable to process each of the signals $401_1$-$407_N$ to generate a corresponding one of signals $407_1$-$409_N$. For transmit the DFE 212 is operable to process each of the signals $417_1$-$417_N$ to generate a corresponding one of signals $421_1$-$421_N$.

The ODEM 216 is as described above. For receive, the modem 212 is operable to recover data from a received signal 404. For transmit, the modem 212 is operable to generate signals $417_1$-$417_N$, each of which corresponds to a signal to be transmitted on a respective lobe.

The interference cancellation circuit 214 is as described above, for example.

Operation of the example implementation of FIG. 4 is described with reference to FIGS. 5A and 5B.

Figure 5A:
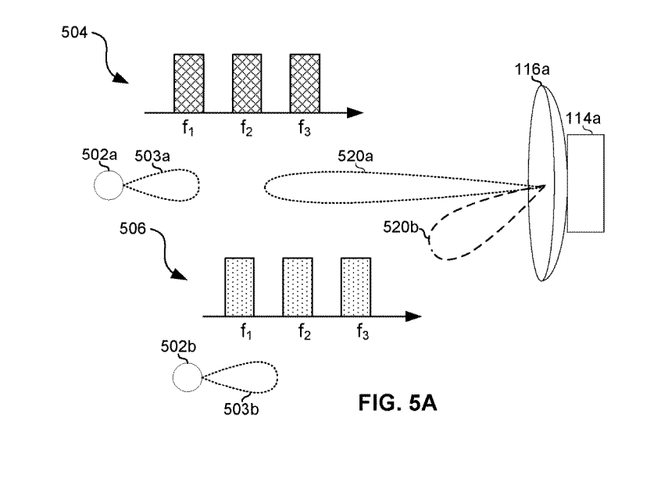
FIGS. 5A and 5B depict a scenario in which aspects of this disclosure are used for reducing the impact of interference resulting from side lobes of the microwave backhaul assembly.
Figure 5B:
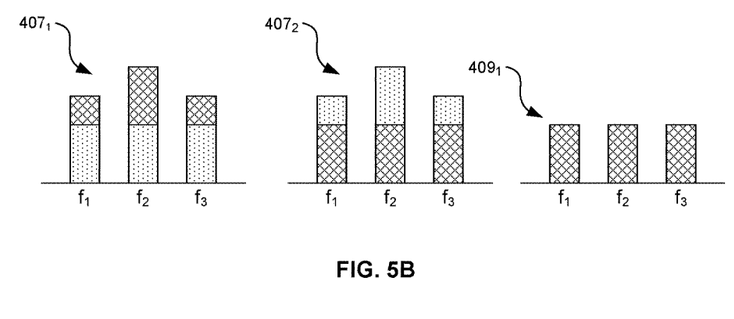

Referring to FIG. 5A, there is shown the assembly 120a configured as shown in FIG. 4. Also shown are two nodes 502a and 502b. The node 502a is transmitting a signal 504 with radiation pattern 503a. The node 502b is transmitting a signal 506 with radiation pattern 503b. The radiation pattern of the antenna 116a in FIG. 5A comprises a primary lobe 520a and a side lobe 520b. With this arrangement of nodes and radiation patterns, lobe 520a captures a relatively larger amount of energy of signal 504 and relatively lesser amount of energy of signal 506. Similarly, lobe 520b captures a relatively larger amount of energy of signal 506 and relatively lesser amount of energy of signal 504.

For illustration, it is assumed that the assembly 120 desires to receive the signal 504 from node 502a. For reception of the signal 504 from the node 502a, the beamforming circuit 406 of assembly 120a is configured to point the primary lobe 520a at node 502a. In the example shown, this comprises placing the primary lobe 502a "on-boresight." The lobe 502b is consequently "off-boresight" in FIG. 5A. Because the lobes 520a and 503b are not perfectly collimated, some energy of signal 506 is captured via lobe 520a. This energy thus amounts to interference. To mitigate the impact of this interference, the beamforming circuit 406 is configured (by control of phase and amplitude coefficients during combining of the signals $405_1$-$407_M$) to recover a first signal $407_1$ corresponding to energy received via primary lobe 520a and a second signal $407_2$ corresponding to energy received via the side lobe 520b. Signal $407_1$ therefore comprises relatively more energy from the desired signal 504 and relatively less energy from the undesired signal 506. Conversely, the signal $407_2$ comprises relatively more energy from the undesired signal 506 and relatively less energy from the desired signal 504. Using the signals $407_1$ and $407_2$, the interference cancellation circuit 214 is operable (e.g., using blind source separation) to cancel/attenuate the undesired signal 506 components such that the amount of energy from signal 506 present in signal $409_1$ is less than the amount of energy from signal 506 present in signal $407_1$. The modem may then process signal $409_1$ to recover the data transmitted on signal 504 by node 502a. FIG. 5B depicts the ideal case in which the components of signal $407_1$ owing to the undesired signal 506 are perfectly cancelled/removed in the signal $409_1$. In other implementations up to N-2 additional signals 407, corresponding to N-2 additional side lobes, may be used for cancelling interference from up to N-2 other sources of interference.

Figure 6:
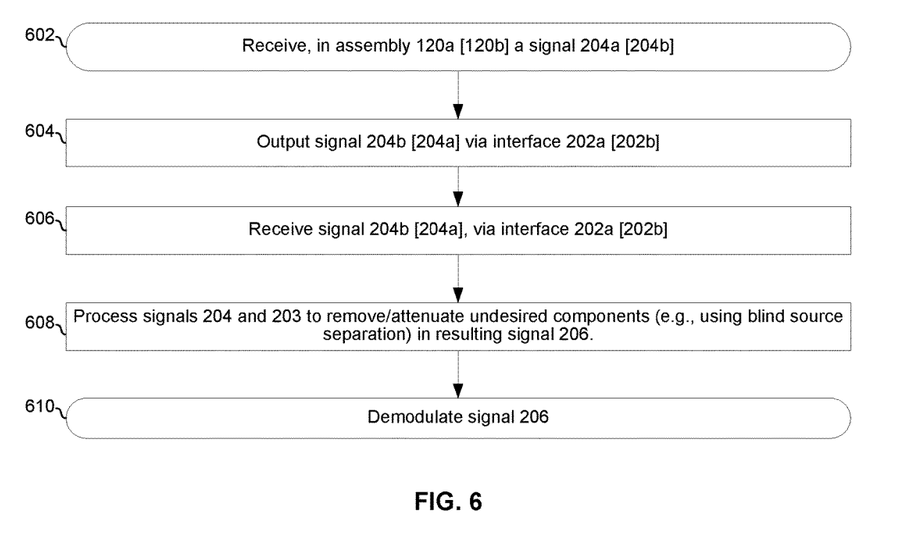
FIG. 6 is a flowchart illustrating an example process for cancelling interference due to back lobes of two microwave backhaul assemblies located at the same site.

FIG. 6 is a flowchart illustrating an example process for cancelling interference due to back lobes of two microwave backhaul assemblies located at the same site.

In block 602, the assembly 120a receives the signal 204a via its antenna 116a, front end 210a, and DFE 212a. Similarly, the assembly 120b receives the signal 204b via its antenna 116b, front-end 210b, and DFE 212b.

In block 604, the assembly 120a outputs signal 204a onto link 122 via interface 202a and the assembly 120b outputs signal 204b onto link 122 via interface 202b.

In block 606, the assembly 120a receives signal 204b via interface 202a, and outputs it as signal 203a. Similarly, the assembly 120b receives signal 204a via interface 202b and outputs it as signal 203b.

In block 608, the interference cancellation circuitry 214a uses the signals 204a and 203a to cancel/attenuate undesired components in signal 204a and output resulting signal 206a. Similarly, the circuitry 214b uses the signals 204b and 203b to cancel/attenuate undesired components in signal 204b and output resulting signal 206b.

In block 610, the modem 216a demodulates signal 206a to recover the data carried therein. Similarly, the modem 216b demodulates signal 206b to recover the data carried therein.

Figure 7:
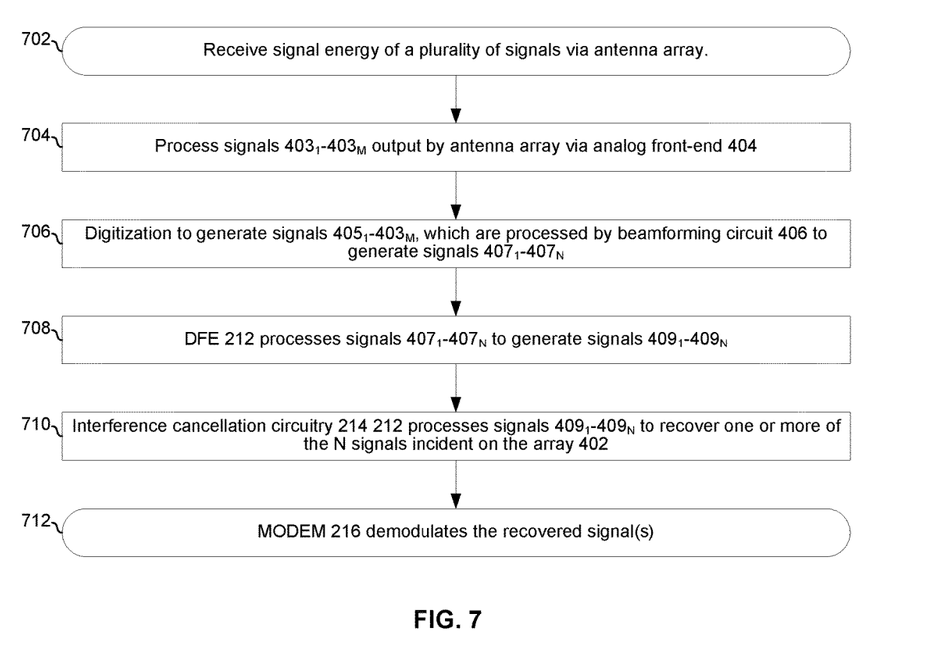
FIG. 7 is a flowchart illustrating an example process for cancelling interference due to side lobes of a microwave backhaul assembly.

FIG. 7 is a flowchart illustrating an example process for cancelling interference due to side lobes of a microwave backhaul assembly.

In block 702, the assembly 120 receives energy of M signals via the antenna array 402. The captured energy is output as signals $403_1$-$403_N$.

In block 704, the AFE 404 processes the signals $403_1$-$403_M$ to generate signals $405_1$-$405_M$.

In block 706, the signals $405_1$-$405_M$ are processed by beamforming circuit 406 to recover signals $407_1$-$407_N$, each of which corresponds to a respective one of N lobes of a radiation pattern of the antenna array 402. Each of the signals $407_1$-$407_M$ contain energy from at least two signals.

In block 708, the signals $407_1$-$407_N$ are processed by DFE 212 to generate corresponding signals $409_1$-$409_N$.

In block 710, interference cancellation circuitry 214 processes the signals $409_1$-$409_N$ to recover one or more of the N signals incident on the array 402. Each of the signals $409_1$-$409_N$ comprises energy from one or more of N signals received via the antenna array 402. Processing techniques such as blind source separation may thus be used for separating out which energy of the signals $409_1$-$409_N$ corresponds to which of the N signals received via the antenna array 402. The situation is analogous to having N equations (the N signals $409_1$-$409_N$ representing N lobes) to solve for N unknowns (the N signals received by the antenna 402). The energy of a desired one or more of the N signals is output as one or more signals 404.

In block 712, the modem 216 demodulates the signal(s) 404 to recover data carried therein.

In accordance with an example implementation of this disclosure, a first microwave backhaul assembly (e.g., 120a) comprises a first antenna (e.g., 116a), a front-end circuit (e.g., 210a and 212a), an inter-backhaul-assembly interface circuit (e.g., 202a), and an interference cancellation circuit (e.g., 214a). The first antenna is operable to receive a first microwave signal (e.g., 209a). The front-end circuit is operable to convert the first microwave signal to a lower-frequency digital signal (e.g., 204a), wherein the lower-frequency digital signal has energy of a second microwave signal (304) and energy of a third microwave signal (306). The second microwave signal may be destined for the first microwave backhaul assembly. The third microwave signal may be destined for the second microwave backhaul assembly. The inter-backhaul-assembly interface circuit is operable to receive information from a second microwave backhaul assembly (e.g., 120b). The interference cancellation circuit is operable to use the information received via the inter-backhaul-assembly interface circuit during processing of the lower-frequency digital signal to remove, from the first microwave signal, the energy of the third microwave signal. The information received via the inter-backhaul-assembly interface may comprise a signal (e.g., 204b) having energy of the second microwave signal. The information received via the inter-backhaul-assembly interface may comprise a signal (e.g., 203b) having energy of the third microwave signal. The information received via the inter-backhaul-assembly interface may comprise an indication of an amount of energy of the third microwave signal received by the second microwave backhaul assembly. The first antenna and a second antenna (e.g., 116b) of the second microwave backhaul assembly may be adjacent to one another such that one or more radiation lobes of the first antenna (e.g., 124a) overlap with one or more radiation lobes of the second antenna (e.g., 118b). The first antenna and a second antenna of the second microwave backhaul assembly may be mounted to the same support structure (e.g., tower 102). The antenna may comprise a first parabolic reflector. The second antenna may comprise a second parabolic reflector. The first parabolic reflector and the second parabolic reflector may be mounted facing away from each other on a support structure. The front-end circuit may be operable to measure a performance metric for the first microwave signal. The inter-backhaul-assembly interface circuit may be operable to output the measured performance metric to a destination external to the first microwave backhaul assembly (e.g., to the second microwave backhaul assembly).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   a transmitter operable to output a transmit signal comprising a desired signal and an interference signal;
   an interface operable to receive information comprising a receive signal having energy at a frequency of the desired signal; and
   an interference cancellation circuit operable to use the information to reduce the interference signal.

2. The system of claim 1, wherein the received information comprises an indication of an amount of energy at a frequency of the interference signal.

3. The system of claim 1, wherein the received information comprises an indication of an amount of energy of the interference signal received at a remote location.

4. The system of claim 1, wherein:
   the desired signal is destined for a first receiver; and
   the interference signal is related to a signal destined for a second receiver.

5. The system of claim 4, wherein one or more radiation lobes of a first antenna, operably coupled to the first receiver, overlap with one or more radiation lobes of a second antenna, operably coupled to the second receiver.

6. The system of claim 5, wherein the first antenna and the second antenna are mounted to the same support structure.

7. The system of claim 5, wherein:
   the first antenna comprises a first parabolic reflector;
   the second antenna comprises a second parabolic reflector; and
   the first parabolic reflector and the second parabolic reflector are mounted facing away from each other on a support structure.

8. The system of claim 1, wherein the interface is operable to output a digital signal to a destination external to the system.

9. The system of claim 1, wherein the system comprises:
   a receiver operable to measure a performance metric for a received microwave signal; and
   the interface is operable to output the measured performance metric to a destination external to the system.

10. A system comprising:
    a local receiver operable to output a digital signal comprising desired signal with interference;
    an interface operable to receive information from a remote receiver, wherein the information received via the interface comprises a signal having energy at the frequency of the interference, wherein the information received via the interface comprises an indication of an amount of energy of the interference received by the remote receiver; and
    an interference cancellation circuit operable to use the information received via the interface to reduce the interference.

11. The system of claim 10, wherein the desired signal is destined for the remote receiver.

12. The system of claim 10, wherein one or more radiation lobes of a first antenna, operably coupled to the local receiver, overlap with one or more radiation lobes of a second antenna, operably coupled to the remote receiver.

13. The system of claim 12, wherein the first antenna and the second antenna are mounted to the same support structure.

14. The system of claim 12, wherein:
    the first antenna comprises a first parabolic reflector;
    the second antenna comprises a second parabolic reflector; and
    the first parabolic reflector and the second parabolic reflector are mounted facing away from each other on a support structure.

15. The system of claim 10, wherein the interface is operable to output the digital signal to a destination external to the system.

16. The system of claim 10, wherein:
the local receiver is operable to measure a performance metric for a received microwave signal; and
the interface is operable to output the measured performance metric to a destination external to the system.

17. The system of claim 10, wherein the local receiver is a wireless communication receiver.

18. The system of claim 10, wherein the information received via the interface comprises a signal having energy at the frequency of the desired signal.

19. A system comprising:
a local receiver operable to output a digital signal comprising desired signal with interference, wherein the desired signal is destined for the remote receiver;
an interface operable to receive information from a remote receiver, wherein the information received via the interface comprises a signal having energy at the frequency of the interference; and
an interference cancellation circuit operable to use the information received via the interface to reduce the interference.

20. The system of claim 19, wherein one or more radiation lobes of a first antenna, operably coupled to the local receiver, overlap with one or more radiation lobes of a second antenna, operably coupled to the remote receiver.

21. The system of claim 20, wherein the first antenna and the second antenna are mounted to the same support structure.

22. The system of claim 20, wherein:
the first antenna comprises a first parabolic reflector;
the second antenna comprises a second parabolic reflector; and
the first parabolic reflector and the second parabolic reflector are mounted facing away from each other on a support structure.

23. The system of claim 19, wherein the local receiver is a wireless communication receiver.

24. A system comprising:
a local receiver operable to output a digital signal comprising desired signal with interference;
an interface operable to receive information from a remote receiver, wherein the information received via the interface comprises a signal having energy at the frequency of the interference, wherein the interface is operable to output the digital signal to a destination external to the system; and
an interference cancellation circuit operable to use the information received via the interface to reduce the interference.

25. The system of claim 24, wherein one or more radiation lobes of a first antenna, operably coupled to the local receiver, overlap with one or more radiation lobes of a second antenna, operably coupled to the remote receiver.

26. The system of claim 25, wherein the first antenna and the second antenna are mounted to the same support structure.

27. The system of claim 25, wherein:
the first antenna comprises a first parabolic reflector;
the second antenna comprises a second parabolic reflector; and
the first parabolic reflector and the second parabolic reflector are mounted facing away from each other on a support structure.

28. The system of claim 24, wherein the local receiver is a wireless communication receiver.

29. A system comprising:
a local receiver operable to output a digital signal comprising desired signal with interference, wherein the local receiver is operable to measure a performance metric for a received microwave signal;
an interface operable to receive information from a remote receiver, wherein the information received via the interface comprises a signal having energy at the frequency of the interference, and wherein the interface is operable to output the measured performance metric to a destination external to the system; and
an interference cancellation circuit operable to use the information received via the interface to reduce the interference.

30. The system of claim 29, wherein one or more radiation lobes of a first antenna, operably coupled to the local receiver, overlap with one or more radiation lobes of a second antenna, operably coupled to the remote receiver.

31. The system of claim 30, wherein the first antenna and the second antenna are mounted to the same support structure.

32. The system of claim 30, wherein:
the first antenna comprises a first parabolic reflector;
the second antenna comprises a second parabolic reflector; and
the first parabolic reflector and the second parabolic reflector are mounted facing away from each other on a support structure.

33. The system of claim 29, wherein the local receiver is a wireless communication receiver.

34. A system comprising:
a local receiver operable to output a digital signal comprising desired signal with interference;
an interface operable to receive information from a remote receiver, wherein the information received via the interface comprises a signal having energy at the frequency of the interference, and wherein the information received via the interface comprises a signal having energy at the frequency of the desired signal; and
an interference cancellation circuit operable to use the information received via the interface to reduce the interference.

35. The system of claim 34, wherein one or more radiation lobes of a first antenna, operably coupled to the local receiver, overlap with one or more radiation lobes of a second antenna, operably coupled to the remote receiver.

36. The system of claim 35, wherein the first antenna and the second antenna are mounted to the same support structure.

37. The system of claim 35, wherein:
the first antenna comprises a first parabolic reflector;
the second antenna comprises a second parabolic reflector; and
the first parabolic reflector and the second parabolic reflector are mounted facing away from each other on a support structure.

38. The system of claim 34, wherein the local receiver is a wireless communication receiver.

* * * * *